United States Patent [19]

Uraneck et al.

[11] 4,092,469
[45] May 30, 1978

[54] CLEAVABLE BRANCHING AGENTS IN EMULSION POLYMERIZATION SYSTEMS

[75] Inventors: Carl A. Uraneck; Paul W. Solomon, both of Bartlesville, Okla.

[73] Assignee: Phillips Petroleum Company, Bartlesville, Okla.

[21] Appl. No.: 758,724

[22] Filed: Jan. 12, 1977

Related U.S. Application Data

[62] Division of Ser. No. 635,002, Nov. 25, 1975, Pat. No. 4,041,227.

[51] Int. Cl.$^2$ .............................. C08F 4/34; C08F 8/00
[52] U.S. Cl. .................. 526/184; 260/2.5 L; 260/23.7 A; 526/190; 526/222; 526/223; 526/224; 528/481; 528/502; 528/503
[58] Field of Search .............. 260/2.5 L, 23.7 A; 526/184, 190, 222, 223, 224; 528/481, 503, 502

[56] References Cited

U.S. PATENT DOCUMENTS

| | | | |
|---|---|---|---|
| 2,160,935 | 8/1953 | Wiley | 526/190 |
| 2,683,704 | 7/1954 | Anspon et al. | 526/190 |
| 3,019,215 | 1/1962 | Kroeper et al. | 526/190 |
| 3,272,786 | 9/1966 | Perry | 526/190 |

*Primary Examiner*—William F. Hamrock

[57] ABSTRACT

Bis(1,3-dienyl)dialkyltin, lead, and germanium compounds employed in the aqueous emulsion polymerization of conjugated dienes, optionally with vinyl comonomers, provide polymers with sufficiently high Mooney viscosity values as to be readily handled in plant operations, yet which exhibit controlled breakdown under milling to lower Mooney values suitable, for a variety of uses.

30 Claims, No Drawings

CLEAVABLE BRANCHING AGENTS IN EMULSION POLYMERIZATION SYSTEMS

This is a Divisional Application of Ser. No. 635,002 filed Nov. 25, 1975, now U.S. Pat. No. 4,041,227 issued Aug. 9, 1977.

FIELD OF INVENTION

The invention relates to aqueous emulsion polymerization systems. In a further aspect, the invention relates to methods to reduce the Mooney value of polymers. In still another aspect, the invention relates to sponge rubbers.

BACKGROUND OF THE INVENTION

Rubbery polymers of moderately low Mooney viscosities are desired in many sponge applications, such as rug underlay manufacture, since the lower viscosity polymers afford a sponge rubber of sufficient drape for such applications.

Unfortunately, polymers of moderately low Mooney viscosity are not convenient dry crumbs, but rather exhibit the characteristic of an undesirably sticky rubber crumb, making drying and handling very difficult. However, these relatively low Mooney viscosity type products are exactly what is desired so as to be able to provide a sponge that ultimately will adequately drape during rug underlay manufacture. Thus, dichotomy has existed, since the rubber manufacturer prefers to make a high enough Mooney viscosity rubber such that handling and drying of the rubber crumb product is relatively easy and economical. But, the higher Mooney viscosity rubbers are just not adequately suitable for many sponge rubber applications, as mentioned.

BRIEF SUMMARY OF THE INVENTION

We have discovered that the inclusion of a bis(1,3-dienyl)dialkyltin, -germanium or -lead compound in the aqueous emulsion polymerization of a conjugated diene, optionally with a vinyl comonomer, produces a polymer of desirable Mooney viscosity that it is readily recovered, handled, and dried in emulsion polymerization production processes, and yet the polymer contains bonds readily cleaved by milling, preferably in admixture with a carboxylic acid, to provide a polymer of sufficiently low Mooney suitable for a variety of end-uses. Exemplarily, the lower Mooney values are desirable so that the rubber, in the sponge form, properly drapes in rug underlay manufacture.

We consider as one aspect of our invention the aqueous emulsion polymerization of the monomers as described with the cleavable branching agents in accordance with our invention, and the polymers so produced. We further encompass as another aspect of our invention the cleaving or milling of the so-produced polymers and the resultant cleaved polymer operation. And, we further include and encompass in a further aspect of our invention the so-cleaved polymers after blowing and curing, and the process of preparing the cured polymers.

DETAILED DESCRIPTION OF THE INVENTION

Our invention involves the employment of a bis(1,3-dienyl)dialkylmetal compound which is a -tin, -germanium, or -lead compound in the aqueous emulsion polymerization of conjugated dienes, optionally with copolymerizable vinyl monomers. The metal compound is employed in a minor effective amount in the aqueous emulsion polymerization system as one of the comonomers during the polymerization.

BRANCHING AGENTS

The agents employed are described generically as bis(1,3-dienyl)dialkyltin, -germanium, and -lead compounds, and can be described as branching agents. Generically, the structure for the branching agent employed in the process of our invention also can be represented by:

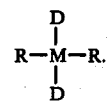

In the above formula, D represents an acyclic conjugated dienyl hydrocarbyl structure or a ring-substituted styryl structure. The acyclic conjugated dienyl hydrocarbyl structure can contain as many as 8 carbon atoms per group, though presently preferred are those of 4 or 5 carbon atoms because of availability and reactivity.

The conjugated dienyl groups can be the same or different. Typical, though not limitative, dienyl structures include the following:

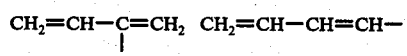

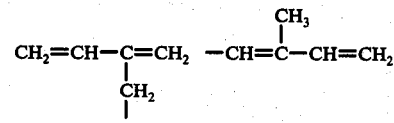

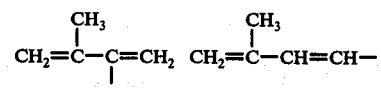

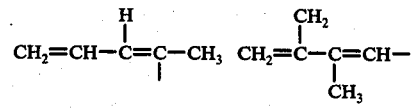

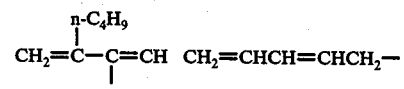

The ring-substituted styryl structures D can be represented by:

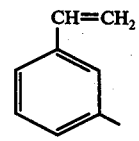

of which the meta-structure presently is preferred because of reactivity. These ring-substituted styryl structures are presently less preferred from the standpoint of reactivity and availability, though some are feasible to employ.

In each of the formulas given, the R groups are hydrocarbyl, and each R group is individually selected from alkyl, linear or branched, or cycloalkyl, with the limitation that each R group has not more than about 12 carbon atoms per R group. R groups can be selected typically from methyl, ethyl, isopropyl, n-hexyl, 4-methylnonyl, n-dodecyl, cyclohexyl, 3-methylcyclopentyl, and the like. The total number of carbon atoms per bis(1,3-dienyl)dialkyl metal compound should be limited to about 20, for reasons of reactivity. M represents the metal atom of the branching agent and can be tin, lead or germanium.

The amount of the bis(1,3-dienyl)dialkyl metal compound employed is that minor amount effective to provide the degree of branching desired. An exemplary and effective as well as typical amount lies in the range of about 0.01 to 1 phm, parts by weight per 100 parts of monomers employed in the emulsion polymerization, presently preferably about 0.05 to 0.5 for reasons of reactivity. The minor effective and suitable amount of branching agent provides a mill-cleavable polymer.

MONOMERS

Aqueous emulsion polymerization process in accordance with our invention involves the free radical polymerization of monomers polymerizable in an aqueous emulsion polymerization system, such as conjugated diene monomers from which elastomers are obtainable.

The polymerizable conjugated dienes include those containing 4 to 12, preferably for commercial availability 4 to 8, carbon atoms per molecule. Examples of these monomers include the presently preferred 1,3-butadiene and isoprene, as well as chloroprene, piperylene, 2-methyl-1,3-pentadiene, 2,3-dimethyl-1,3-butadiene, 1,3-octadiene, 5,6-diethyl-1,3-octadiene, and the like. The conjugated dienes can be polymerized to form homopolymers or copolymers of two or more.

Polymers of conjugated dienes include also copolymers formed by polymerizing one or more conjugated dienes with one or more copolymerizable monovinyl-substituted including substituted monovinyl-substituted aromatic compounds, such as those of 8 to 20, more particularly for commercial availability 8 to 12, carbon atoms per molecule, including styrene, various of the substituted styrenes such as the alkylstyrenes such as o-, m-, or p-methylstyrene, beta-methylstyrene, o-, m-, and p-halostyrenes such as o-chlorostyrene and 2,3-dichlorostyrene and wherein the halo can be fluorine, chlorine, bromine, or iodine; and also other copolymerizable ethylenically unsaturated monomers including the vinyl nitriles such as acrylonitrile or methacrylonitrile, esters of acrylic and methacrylic acid, e.g., ethyl acrylate and methyl methacrylate, vinyl esters such as vinyl acetate, other reactive olefins such as vinylidene chloride; and the like.

Our invention is particularly applicable in the various SBR polymerization systems, including SBR 1000 a hot rubber formulation, and also in SBR 1500 and SBR 1503 which are cold rubber formulations.

POLYMERIZATION CONDITIONS

Aqueous emulsion polymerization conditions of temperature, time, pressure, and the like can range widely, depending upon particular materials and reactor conditions desired or convenient to employ, the monomers involved, relative volatility thereof, amounts of water, and equipment involved.

In aqueous emulsion polymerization, the emulsion usually is considered to be of the oil-in-water type, oil referring to the monomer, and wherein the aqueous medium is the continuous phase, with the monomer or monomers as the discontinuous phase. The ratio of aqueous medium to monomeric material usually employed is in the range of about 0.5:1 to about 3:1, parts by weight, though the range can vary widely depending on particular operations, or preferences of those skilled in the art.

A wide variety of emulsifying agents can be employed satisfactorily to produce the desired monomer emulsion in aqueous medium, including rosin acid soaps, disproportionated rosin acid soaps, fatty acid soaps, mixtures of disproportionated rosin acid soaps with fatty acid soaps, alkaryl sulfonates, and other surface active materials and mixtures thereof. Nonionic emulsifiers also can be employed including polyethers and polyols.

Amounts of emulsifying agent employed depend on the type and reaction parameters and monomer concentrations. An expedient range would be about 0.5 part to 10 phm. The relative amounts of emulsifier:modifier can range widely depending on monomers, species, reaction parameters, degree of modification desired, and the like.

Aqueous medium normally is employed with the emulsifier, though other components such as glycols may be added for lower temperature polymerizations when desired. The amount of water or water and glycol employed is a matter of convenience as to amounts of materials to handle and is not limiting as far as making the agitated admixture of emulsifier:modifier is concerned. Supplemental water for the emulsion polymerization process itself can be later added at that stage.

Aqueous emulsion polymerization commonly is carried out by continuously agitating the polymerization emulsion at polymerization temperatures expediently in the range of about $-40°$ to $+100°$ C., preferably about $0°$ to $50°$ C. The pH range can vary widely such as about 1 to 12, and presently preferably about 7 to 10.8.

MODIFIERS

The aqueous emulsion polymerization process can employ molecular weight modifiers or regulators generally effective in an aqueous emulsion polymerization system.

Modifiers most frequently used to control the molecular weight of polymers in an aqueous emulsion polymerization process are those with a regulating index, $r$, or a transfer constant, $c_{tr}$, in the range of about 0.01 to 25. The regulating index is defined by $d(\ln S)/dx = -r$, and the transfer constant by $d(\log S)/d(\log M) = C_{tr}$, where S is the modifier concentration, $x$ is the fractional conversion, and M is the monomer concentration. Suitable modifiers include such as the mercaptans and xanthogen disulfides. For these types, the modifier depletion can be readily measured by analysis of the remaining modifier in the polymerization medium by titration techniques as described by Bovey et al in *Emulsion Polymerization* (Interscience, N.Y. 1955) Chapters IV and VIII. In instances where the modifier depletion cannot be readily followed, the transfer constant can be measured by the Mayo technique (see reference cited).

Suitable mercaptans include primary, secondary, and tertiary aliphatic, cyclic, alicyclic, and aromatic mercaptans, preferably of 8 to 20 carbon atoms per molecule. Exemplary species include n-octyl to n-octadecyl, s-octyl to s-octadecyl, and t-octyl to t-octadecyl, cyclododecyl, cyclodecenyl and cyclododecenyl, cyclododecadienyl, 1,3,5-trimethylcyclododecadienyl, B-naphthyl, t-butylphenyl, octyl to dodecyl mercaptoesters, and the like. Frequently employed disulfide modifiers include dialkyl xanthogen disulfides such as diisopropyl, di-s-butyl, difuranyl, and the like. Nonsulfur modifiers can also be used and examples of these include carbon tetrachloride, carbon tetrabromide, octyl chloroacetate, terpenoline, pentaphenylethane, and other similar free radical reactive compounds. Other useful modifiers include the dialkyl dixanthogens, diaryl disulfide, tetraalkylthiuram mono- and disulfides and mercaptothiazoles.

Examples of specific species of organosulfur compounds include n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan; aryl mercaptans such as 1-naphthalenethiol, and the like; bis(tetrahydrofurfural xanthogen), diphenyl disulfide, tetramethyl thiuram disulfide, 2-mercaptobenzothiazole, and the like. Mixtures or blends of any of these organosulfur compounds can also be used. Commercially available and suitable organosulfur compound modifiers often are mixtures of organosulfur compounds, e.g., mixtures of t-dodecyl, t-tetradecyl, and t-hexadecyl mercaptans.

Presently preferred modifiers for preparing our new polymers are the tertiary alkyl mercaptans such as t-nonyl to t-dodecyl mercaptans, and also diisopropyl xanthogen disulfide.

The amount of modifier employed may vary widely, depending upon the particular compound or mixture chosen, the polymerization temperatures, the emulsifier and other recipe ingredients, and the extent of results or modification desired. Satisfactory modification can be obtained by employing on the order of 0.01 to 5 phm, parts modifier compound per 100 parts monomer by weight, with 0.05 to 2 phm presently being preferred, though greater or lesser amounts may be utilized where desired.

INITIATORS

Free-radical initiators useful in the aqueous emulsion polymerization process include any of the broad groups of compounds and redox couples capable of generating free radicals in aqueous emulsion polymerization systems. These include the monomer-soluble organoperoxides, hydroperoxides, azo and diazo compounds. Amounts expediently employed are of the order of about 0.01 to 5 phm, more preferred about 0.03 to 1 phm.

Exemplary catalysts include di-t-butylperoxide, benzoyl peroxide, lauroyl peroxide, benzene diazothioether, t-butyl peracetate, t-butyl perbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropylbenzene hydroperoxide, p-t-butylcumene hydroperoxide, pinene hydroperoxide, 2,2'-azobis(2-methylpropionitrile), often called AIBN, potassium persulfate, and the like, and mixtures thereof.

Useful exemplary redox couples include ferrous sulfate/hydrogen peroxide, potassium persulfate/sodium bisulfite, mercaptan/potassium ferricyanide, and the like; as well as organic hydroperoxide/complexed iron reductant such as p-menthane hydroperoxide/ferrous salt ethylene dinitrilotetraacetic acid complex/sodium formaldehyde sulfoxylate (SFS); p-isopropyl cumene hydroperoxide/sodium dithionite; cumene hydroperoxide/ferrous pyrophosphate complex; t-butyl cumene hydroperoxide/triethylenetetraamine/ferrous pyrophosphate; and the like. The presently preferred initiator systems are potassium persulfate and the SFS redox couple.

After the degree or extent of polymerization desired has been accomplished, the polymerization reaction can be terminated with a shortstop, such as sodium dimethyldithiocarbamate. An antioxidant such as N-phenyl-N'-(1,3-dimethylbutyl)-p-phenylenediamine usually is added to protect the polymer. The emulsion process results in a latex from which the polymer then is recovered by a process known as creaming, i.e., the addition of an aqueous salt solution such as sodium chloride solution, and coagulation of the polymeric product by the addition of a dilute mineral acid such as sulfuric acid. The product then is collected by filtration, washed, dried in conventional drying equipment.

MILLING

The milling operation can be conducted with any convenient milling means known in the art, for a time suitable to effect the Mooney decrease desired. The milling time generally is determined by the temperature desired, that is, milling is continued as necessary to reach the maximum milling temperature sought by the processor. While milling temperatures can range broadly, the only restriction needed with our invention is that the milling temperature be such as from at least about 120° C. to 200° C., but more usually within the range of about 140° to 160° C., presently preferably about 150° C., to provide optimum cleavage rates and safe processing. Auxiliary heating can be employed, if desired, to shorten cleavage times.

A variety of breakdown (cleavage) procedures can be used. The polymer cleavage step can be on a hot mill, or in a mixer such as a Banbury, or the like, so long as the temperature is at least about 120° C.

The cleavage reaction which takes place under milling conditions as discussed is facilitated by the employment in the rubbery product to be milled of a carboxylic acid, which can be saturated or unsaturated, and can be any of the types commonly employed in rubber vulcanization systems. Commonly, these range from about 12 to 20 carbon atoms per molecule, either as single acids, or as commercially available admixtures. Exemplary species of these acids include stearic, myristic, lauric, linoleic, oleic, ricinoleic, palmitic, and the like. These acids can be employed as such, or as the alkali metal soap thereof, such as sodium, potassium, or the like, and we consider our invention to include such soap as alternative to the acid form when we refer to the carboxylic acids.

The amount of the carboxylic acid to employ can range widely. Presently recommended is about 0.5 to 5 phr, parts by weight per 100 parts rubber, more preferably about 1 to 2 phr since these amounts are commonly used in vulcanization recipes and also are quite satisfactory in this aspect of our invention. This component generally is added during or at the onset of milling, though it should be noted that if a formulation such as an SBR formulation is employed in which the recipe for same contains a fatty acid soap, such as SBR 1503, within the suggested amount, then no additional fatty acid need be added at this stage. Furthermore, the use of the stearic acid, or similar, is optional, if one of the monomers employed itself contains a carboxylic acid group, such as acrylic acid.

It is ordinarily preferred for convenience and economy to rely upon the customary milling operation, i.e., the milling operation in which the compounding recipe ingredients are blended into the rubber preparatory for curing, to accomplish the cleavage reaction. However, it is within the scope of this invention alternatively to employ supplemental milling of the rubber optionally in the presence of a carboxylic acid prior to the addition of the remainder of the compounding ingredients for said customary milling step. This optional preliminary milling is advantageous for a branched rubber of particularly high Mooney or one with which it was desired to periodically determine the degree of cleavage accomplished. Further, this preliminary milling can be of value under circumstances as with emulsion polymerized 1,3-butadiene intended for blending with other rubbery polymers. Here, branching in accordance with this invention can be employed to initially obtain a polymer of Mooney conveniently high for handling in conventional plant operation. Then, employing preliminary milling, the polymer, such as polybutadiene, can be converted into a lower Mooney stage suitable for easy blending with other rubber polymers and curatives such as in the preparation of a tire tread stock.

It should be noted that the temperature stability of our polymers is advantageous since they undergo little or no breakdown at temperatures below at least about 120° C. The higher temperature stability of our polymers is a distinct advantage in manufacturing since there is little hazard of changes in characteristics while processing.

Polymers in accordance with our invention can be compounded as commonly practiced with a variety of stabilizers, antioxidants, fillers, pigments, reinforcing agents, and other such additives as may be employed in various compounding operations.

As a guiding approximation, and not as a limitation, rubbers of a Mooney ML-4 of about 10 to 27 can be readily branched in accordance with our invention to rubbers of Mooney ML-4 of about 30 to 65. These are realistic ranges to consider with regard to many sponge rubber applications. It should be recognized, however, that the application of our invention is not necessarily limited to these values, but that these are typical applications for the primary aim of our invention, sponge rubber applications.

BLOWING AND CURING

Rubbers that have been prepared in a polymerization process employing a branching agent in accordance with one aspect of our invention can, following isolation, be compounded with agents required for blowing and curing. Suitable blowing agents include such as urea, sodium bicarbonate, N,N'-dinitrosopentamethylene tetramine, azodicarbonamide, p,p'-oxybis(benzenesulfonyl hydrazide) and 2,2'-azobis(2-methylpropionitrile). The compounding can be conveniently carried out in an internal mixer to providing thorough mixing. The rubber compound from the internal mixer can then be banded and sheeted off employing a roll mill. The sheet thus obtained can be cut to size for laying on a grid of woven wire of, for example, the type suitable for the manufacture of waffle weave shaped rug underlay. The sheet thus cut and placed on the grid can then be cured on the grid in an oven or in a heated press or the like with provision that sufficient clearance, e.g., about 0.5 to 0.75 in., is allowed both above and below the grid to permit blowing of the rubber with draping thereof through the openings within the grid as elevated temperatures are applied for curing. Suitable curing times can range widely, such as from about 2 minutes to 30 minutes, preferably from about 5 minutes to 15 minutes. Curing temperatures can vary widely, such as from about 150° to 180° C., preferably from about 160° to 175° C.

EXAMPLES

The following examples are intended to further illustrate our invention. The polymerization steps are carried out under an inert atmosphere, e.g., nitrogen. Particular species employed, particular conditions, particular amounts used in the examples, are intended to be illustrative and not limitative of the reasonable and proper scope of our invention.

EXAMPLE I

A series of runs were made employing SBR procedures and varying amounts of a bis(1,3-dienyl)dialkyltin branching agent in accordance with the following recipe:

| RECIPE | phm[1] |
|---|---|
| 1,3-Butadiene | 70 |
| Styrene | 30 |
| Water | 180 |
| Polymerization grade hydrogenated fatty acid potassium salt | 4.6 |
| Potassium hydroxide | 0.02 |
| Potassium chloride | 0.3 |
| Sodium alkylnaphthalene sulfonate | 0.20 |
| (Ethylenedinitrilo)tetraacetic acid tetrasodium salt tetahydrate (in soap solution/in activator solution) | 0.016/0.032 |
| Ferrous sulfate heptahydrate | 0.01 |
| Sodium formaldehyde sulfoxylate dihydrate | 0.05 |
| p-Menthane hydroperoxide | 0.0625 |
| tert-Dodecyl mercaptan (commercial grade) | 0.32 in runs 1, 3, 4, 5; 0.25 in run 2. |
| Bis(2-[1,3-butadienyl])dimethyltin | variable |
| Polymerization time, hours | 5.5 run 1; 5.4 run 2; 5.7 runs 3, 4, 5. |
| Polymerization temperature, ° C | 5 |
| Shortstop: sodium dimethyldithiocarbamate, 40% aq. solution | 0.16 |
| Antioxidant: N-phenyl-N'-(1,3-dimethylbutyl)-p-phenylenediamine | 1.0 |

[1]phm = parts by weight per hundred of total monomers.

Results obtained are shown in tabular form:

TABLE I

| Run | 1 | 2 | 3 | 4 | 5 |
|---|---|---|---|---|---|
| Bd$_2$SnMe$_2$, phm[1] | 0 | 0 | 0.05 | 0.075 | 0.10 |
| Conversion, Wt. % | 59.5 | 60.3 | 61.4 | 60.4 | 60.5 |
| ML-4 at 100° C[2] | 19.5 | 42.5 | 35 | 50.5 | 56 |
| Inherent viscosity[3] | 1.39 | 1.91 | 1.71 | 1.93 | 2.12 |
| Gel, wt. %[4] | 0 | 0 | 0 | 0 | 0 |

[1]Bis(2-[1,3-butadienyl]) dimethyl tin.
[2]ASTM D 1646-63
[3]Inherent viscosity determined in accordance with U.S. Pat. No. 3,278,508, column 20, note a with the modification that the solution was not filtered through a sulfur absorption tube but rather a sample of the solution was filtered through a fritted glass filter stick of grade C porosity and pressured directly into the viscometer.
[4]The gel content of the polymer was determined in weight percent in accordance with U.S. Pat. No. 3,278,508, column 20 note b.

The ML-4 value obtained in comparison run 2, without the additive of our invention, was relatively high, attributable to the relatively low amount of mercaptan modifier employed as compared to the amounts employed in the other runs. Run 1 is a comparative run employing the same amount of modifier as did runs of the invention 3, 4 and 5. A comparison of control run 1 versus runs of the invention 3, 4 and 5 employing the branching agent, clearly shows that the use of a branching agent, and as the amounts of branching agent increase, resulting in increases in Mooney viscosity and inherent viscosity. All polymers, despite the increased ML-4 values, were notably gel free.

EXAMPLE II

Further runs were made with and without the branching agents of our invention. SBR procedures employed were in accordance with the following standard recipe:

| RECIPE | phm |
|---|---|
| 1,3-Butadiene | 70 |
| Styrene | 30 |
| Water | 180 |
| Polymerization grade hydrogenated fatty acid potassium salt | 4.6 |
| Potassium hydroxide | 0.02 |
| Potassium chloride | 0.3 |
| Sodium alkylnaphthalene sulfonate | 0.2 |
| (Ethylenedinitrilo)tetraacetic acid tetrasodium salt tetrahydrate (in soap solution/in activator solution) | 0.016/0.032 |
| Ferrous sulfate heptahydrate | 0.01 |
| Sodium formaldehyde sulfoxylate dihydrate | 0.05 |
| p-Menthane hydroperoxide | 0.063 |
| tert-Dodecyl mercaptan (commercial grade) | (run 6 = 0.395, run 7 = 0.392) |
| Bis(2-[1,3-butadienyl])dimethyltin | variable |
| Polymerization time, hours | Run 6 = 5 hrs., run 7 = 5.2 hrs. |
| Polymerization temperature, ° C | 5 |
| Shortstop: sodium dimethyldithiocarbamate, 40% aq. solution | 0.16 |
| Antioxidant: N-phenyl-N'-(1,3-dimethylbutyl)-p-phenylene diamine | 1.0 |

Two runs were made in accordance with the recipe above, run 6 without branching agent, run 7 with branching agent. A portion of the product of run 7 thereafter was milled for 8 minutes at up to 150° C in an internal mixer. Results obtained are shown in Table II below:

TABLE II

| Polymer | 6 | 7 | 7-milled |
|---|---|---|---|
| $Bd_2SnMe_2$, phm | 0 | 0.13 | |
| Conversion, wt. % | 59.1 | 58.9 | |
| ML-4 at 100° C | 14 | 35 | 24 |
| Inherent viscosity | 1.23 | 1.83 | 1.42 |
| Gel, wt. % | 0 | 0 | 0 |
| $M_w$, thous.[1] | 182 | 495 | 268 |
| $M_n$, thous.[1] | 56 | 94 | 71 |

[1]G. Kraus and C. J. Stacy, 10 J. Poly. Sci. A-2 657 (1972).

The effectiveness of the cleavable branching agents of our invention clearly can be observed from the data summarized in Table II above. The ML-4 value of the control run 6, no branching agent, is only 14. The ML-4 value obtained for the branched polymer employing the branching agent in accordance with out invention was 35, a value readily handled in conventional recovery and drying equipment. After milling, the ML-4 value was 24, thus demonstrating cleavage of the molecular structure on the mill. The 24 is a suitable value for sponge rubber applications.

EXAMPLE III

Polymer 6 above and Polymer 7 thereafter were employed in a rug underlay formulation in accordance with the following recipe:

| RECIPE | Parts by weight |
|---|---|
| Polymer | 100 |
| #10 white ($CaCO_3$) | 225 |
| Superex clay (hydrated aluminum silicate) | 50 |
| Zinc oxide | 4 |
| Oleic acid | 10 |
| Circo light oil (naphthenic oil) | 62.5 |
| Petrolatum | 15 |
| Silene EF (hydrated, precipitated calcium silicate) | 3 |
| Unicel (N,N'-dinitrosopentamethylene tetramine) | 7 |
| Sodium bicarbonate | 7 |
| Stantone Blue (a phthalocyanine dye) | 0.5 |
| Sulfur | 5.5 |
| Altax (benzothiazyl disulfide) | 2 |
| Methyl Tuads (tetramethylthiuram disulfide) | 1 |
| Methyl Zimate (zinc dimethyldithiocarbamate) | 0.5 |

The oleic acid, present in the curing recipe as a processing aid, can by its presence also act as a cleaving agent supplemental to the residual fatty acid present. In the above example cleaving was accomplished in the mixing step.

Three individual evaluations were made. The results obtained are summarized in Table III:

TABLE III

| Evaluation No. | Polymer | Raw ML-4 at 100° C | Mixing Procedure | Properties of Cured Sponge | | |
|---|---|---|---|---|---|---|
| | | | | Drape | Structure | Pore Uniformity |
| 1 | 6 | 14 | A[2] | poor | coarse | poor |
| 2 | 7 | 35 | A[3] | poor | medium | fair |
| 3 | 7 | 35 | B[4] | fair | medium | good |

1. Refer Example II.
2. The compound was mixed in an internal mixer for 2.75 min. (dump temperature, 77° C). (The mixer had not been prewarmed and the entire formulation was mixed in one batch.) The compound was then massed on a roll mill, removed from the mill and allowed to cool. The compound was then placed on a rug underlay grid and cured for 10 min. at 171° C.
3. The dump temperature was 85° C, otherwise footnote 2 applies.
4. The polymer, calcium carbonate, hydrated aluminum silicate, zinc oxide, oleic acid, naphthenic oil, petrolatum, calcium silicate and dye were charged to an internal mixer preheated to 120° C and mixed for 5 min. (dump temperature, 145° C). This mix was then massed on a roll mill, removed, returned to the internal mixer at 120° C along with the balance of the recipe, mixed until uniform, dumped to a roll mill, massed, removed and allowed to cool. The compound was then placed on a rug underlay grid and cured 10 min. at 171° C.

A rug underlay of serviceable, practical quality resulted from evaluation Run 3 above. Run 2 was acceptable, though marginal. It can be observed, thusly, that the preferred mode of treatment is to use a hot mix/remix procedure as described above for evaluation Run 3 (see footnote 4 above).

EXAMPLE IV

In further comparative runs, efforts were made to employ tetravinyltin as a branching agent in aqueous emulsion polymerizations. However, it was not effective.

The bis(1,3-dienyl)dialkyltin, -germanium, and -lead branching agents can be readily synthesized from chloroprene by a Grignard procedure. This involves the reaction of 2-chloro-1,3-butadiene with magnesium in the presence of zinc chloride and methyl iodide followed by the addition of dimethyldichlorostannane for subsequent reaction to yield bis(2-[1,3-butadienyl])dimethyltin.

This disclosure, including data, illustrate the value and effectiveness of our invention. The examples, the knowledge and background of the field of the invention and general principles of chemistry and other applicable sciences, have formed the bases from which the broad descriptions of the invention including the ranges of conditions and generic groups of operant components have been developed, which have formed the bases for our claims here appended.

We claim:
1. A process of preparing a milled polymer which comprises milling a polymer prepared by the steps of polymerizing at least one polymerizable monomer selected from conjugated dienes and conjugated dienes with a vinyl comonomer, with a free radical generating initiator, employing emulsifier, molecular weight modifier, aqueous medium, and a minor effective amount of a bis(1,3-dienyl)dialkylmetal compound which is a bis(1,3-dienyl)dialkyltin, -germanium, or -lead compound, under aqueous emulsion polymerization conditions, wherein said minor effective amount of said tin, germanium, or lead compound is effective to result in a millcleavable polymer, and wherein said milling of said polymer is at a temperature and time effective to decrease the Mooney value thereof, thereby preparing said milled polymer,
wherein said bis(1,3-dienyl)dialkyltin, -germanium, or -lead compound is represented by the formula:

wherein each D is an acyclic hydrocarbyl conjugated dienyl radical, or a ring-substituted styryl, wherein each R is a hydrocarbyl radical and is alkyl or cycloalkyl, and wherein M is said tin, germanium, or lead.

2. The process according to claim 1 wherein said polymerizable monomer is a conjugated diene of 4 to 12 carbon atoms per molecule, and said vinyl comonomer is a monovinyl-substituted compound of 8 to 20 carbon atoms per molecule, ethylenically unsaturated nitrile, ester of acrylic or methacrylic acid, vinyl ester, substituted styrene, or mixture.

3. The process according to claim 2 wherein said polymerizable monomer is said polymerizable conjugated diene, and is selected from the group consisting of 1,3-butadiene, isoprene, chloroprene, piperylene, 2-methyl-1,3-pentadiene, 2,3-dimethyl-1,3-butadiene, 1,3-octadiene, 5,6-diethyl-1,3-octadiene, or mixture of two or more.

4. The process according to claim 2 wherein said polymerizable monomer is butadiene or isoprene with a vinyl comonomer which is styrene, p-methylstyrene, beta-methylstyrene, o-, m-, or p-chlorostyrene, 2,3-dichlorostyrene, acrylonitrile methacrylonitrile, ethyl acrylate, or ethyl methacrylate.

5. The process according to claim 1 wherein in said bis(1,3-dienyl)dialkyltin, -germanium, or -lead compound
each said D contains up to 8 carbon atoms, each R contains up to 12 carbon atoms per R radical, such that said compound contains 10 to 20 carbon atoms per molecule.

6. The process according to claim 5 wherein said minor effective amounts of said bis(1,3-dienyl)dialkyltin, lead, or germanium compound is in the range of about 0.01 to 1 phm, and said milling temperature is at least about 120° C.

7. The process according to claim 6 further admixing prior to or coincidental with said milling a carboxylic acid in the range of about 0.5 to 5 parts by weight per 100 parts rubber, wherein said carboxylic acid contains from about 12 to 20 carbon atoms per molecule.

8. The process according to claim 7 wherein said milling step is conducted at a temperature in the range of about 120° to 200° C. for a time sufficient to result in a decrease in the Mooney viscosity of said polymer.

9. The process of claim 8 wherein said carboxylic acid is stearic, myristic, lauric, linoleic, oleic, recinoleic, palmitic, or mixture.

10. The process according to claim 9 wherein said emulsifier is a rosin acid soap, disproportionated rosin acid soap, fatty acid soap, alkaryl sulfonate, nonionic emulsifier, or mixture, and is employed in amount sufficient to provide 0.5 to 10 phm of said emulsifier in said emulsion polymerization system;
said aqueous emulsion polymerization conditions include a polymerization temperature of about −40° C to 100° C, a pH in the range of about 1 to 12, and wherein said free radical initiator is employed in a range of about 0.01 to 5 phm; and
wherein said molecular weight modifier is a mercaptan, dialkyl xanthogen disulfide, diaryl disulfide, tetraalkylthiuram mono- or disulfide, or mercaptothiazole.

11. The process according to claim 10 wherein said molecular weight modifier is a said mercaptan, which contains 8 to 20 carbon atoms per molecule, and is employed in a range of about 0.01 to 5 phm.

12. The process according to claim 11 wherein said free radical initiator is di-t-butylperoxide, benzoyl peroxide, lauroyl peroxide, t-butyl peracetate, t-butylperbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropyl hydroperoxide, p-t-butylcumene hydroperoxide, pinene hydroperoxide, 2,2'-azobis(2-methyl-propionitrile), or mixtures thereof; and
wherein said mercaptan is n-octyl mercaptan, n-dodecyl mercaptan, t-nonyl mercaptan, t-dodecyl mercaptan, t-hexadecyl mercaptan, t-octadecyl mercaptan, t-eicosyl mercaptan, secoctyl mercaptan, sec-tridecyl mercaptan, cyclododecyl mercaptan, aryl mercaptans such as 1-naphthalene-thiol, bis(-tetrahydrofurfural)xanthogen disulfide, diphenyl disulfide, tetramethylthiuram disulfide, or 2-mercaptobenzothiazole.

13. The process according to claim 12 wherein said monomers are butadiene and styrene, said free radical initiator is p-menthane hydroperoxide and SFS, said mercaptan is t-dodecyl mercaptan, said bis(1,3-dienyl)-dialkylmetal compound is bis(2-[1,3-butadienyl]-)dimethyltin.

14. The process of claim 8 wherein said polymerizable monomers are butadiene and styrene, and said metal compound is bis(2-[1,3-butadienyl])dimethyltin.

15. The process according to claim 8 wherein said metal compound is the tin compound.

16. The process according to claim 8 wherein said metal compound is the lead compound.

17. The process according to claim 8 wherein said metal compound is the germanium compound.

18. The process of preparing a foamed cured rubber suitable as a rubber underlay which comprises the steps of
a. polymerizing under aqueous emulsion polymerization conditions at least one conjugated diene, optionally with a copolymerizable vinyl comonomer, employing aqueous media, molecular weight modifier, free-radical generating initiator, and a bis(1,3-dienyl)dialkyl metal compound, a minor amount effective as a branching agent, thereby producing a mill-cleavable rubbery conjugated diene polymer, wherein said bis(1,3-dienyl)dialkylmetal compound is represented by the formula:

wherein each D is an acyclic hydrocarbyl conjugated dienyl radical, or a ring-substituted styryl, wherein each R is a hydrocarbyl radical and is alkyl or cycloalkyl, and wherein M is tin, germanium, or lead, b. admixing said mill-cleavable rubbery polymer with effective amounts of blowing and curing agents under milling conditions at a temperature and for a time sufficient to result in a decrease in the Mooney viscosity of said cleavable polymer, c. curing said milled polymer.

19. The process according to claim 17 wherein in said bis(1,3-dienyl)dialkyltin, -germanium, or -lead compound, each said D contains up to 8 carbon atoms, each R contains up to 12 carbon atoms per R radical, such that said compound contains 10 to 20 carbon atoms per molecule.

20. The process according to claim 19 wherein said effective amount of said branching agent is in the range of about 0.01 to 1 phm, and said milling is conducted at a temperature of at least about 120° C.

21. The process according to claim 20 wherein said polymerizable conjugated diene contains 4 to 12 carbon atoms per molecule, and said vinyl comonomer is a monovinyl-substituted aromatic compound of 8 to 20 carbon atoms per molecule, substituted styrene, ethylenically unsaturated nitrile, ester of acrylic acid, ester of methacrylic acid, vinyl ester, vinylidene chloride, or mixture.

22. The process of claim 19 wherein said carboxylic acid is stearic, myristic, lauric, linoleic, oleic, ricinoleic, palmitric, or mixture.

23. The process according to claim 18 wherein said branching agent is a bis(1,3-dienyl)dialkyltin compound.

24. The process according to claim 18 wherein said branching agent is a lead compound.

25. The process according to claim 18 wherein said branching agent is a germanium compound.

26. The process of claim 23 wherein said bis(1,3-dienyl)dialkyltin compound is bis(2-[1,3-butadienyl])dimethyltin, said monomers are butadiene and styrene in a weight ratio of about 70/30, and said carboxylic acid is oleic or stearic acid.

27. The process according to claim 21 further incorporating into the polymer a carboxylic acid in the range of about 0.5 to 5 parts by weight per hundred parts of rubber, wherein said carboxylic acid contains about 12 to 20 carbon atoms per molecule.

28. The process according to claim 27 wherein said milling temperature is in the range of about 120° to 200° C.

29. The process according to claim 28 wherein said polymerizable monomer is 1,3-butadiene or isoprene, and styrene, said carboxylic acid is oleic or stearic acid, and said bis(1,3-dienyl)dialkyl metal compound is bis(2-[1,3-butadienyl])dimethyl tin.

30. The process of claim 24 wherein said blowing agent is urea, sodium bicarbonate, N,N'-dinitrosopentamethylene tetramine, azodicarbonamide, p,p'-oxybis(benzenesulfonyl hydrazide), or 2,2'-azobis(2-methylpropionitrile).

* * * * *

UNITED STATES PATENT AND TRADEMARK OFFICE
CERTIFICATE OF CORRECTION

PATENT NO. : 4,092,469

DATED : May 30, 1978

INVENTOR(S) : Carl A. Uraneck et al

It is certified that error appears in the above-identified patent and that said Letters Patent are hereby corrected as shown below:

Claim 12, Col. 12, line 43, should be --- sec-octyl --- as in the original claim.

Claim 14, Col. 12, line 1, change to depend on 9 as in original claim.

Claim 19, Col. 13, line 1, change to depend on 18 as in original claim 22 as amended 4-18-77.

Claim 30, Col. 14, line 1, change to depend on 28.

Signed and Sealed this

Twenty-ninth Day of May 1979

[SEAL]

Attest:

RUTH C. MASON
Attesting Officer

DONALD W. BANNER
Commissioner of Patents and Trademarks